United States Patent [19]
Curry et al.

[11] Patent Number: 6,128,740
[45] Date of Patent: Oct. 3, 2000

[54] COMPUTER SECURITY SYSTEM AND METHOD WITH ON DEMAND PUBLISHING OF CERTIFICATE REVOCATION LISTS

[75] Inventors: Ian Curry, Kanasa; Paul C. Van Oorschot, Ottawa, both of Canada

[73] Assignee: Entrust Technologies Limited, Ottawa, Canada

[21] Appl. No.: 08/986,435

[22] Filed: Dec. 8, 1997

[51] Int. Cl.⁷ .................................................. G06F 11/30
[52] U.S. Cl. .............................. 713/200; 380/51; 380/59; 705/51; 705/57; 705/76; 713/152; 713/156; 713/175; 713/179; 707/10
[58] Field of Search ................................. 380/25, 51, 59; 707/10; 705/51, 57, 76; 713/152, 156, 175, 179, 200

[56] References Cited

U.S. PATENT DOCUMENTS

| | | | |
|---|---|---|---|
| 5,687,235 | 11/1997 | Perlman et al. | 380/25 |
| 5,699,431 | 12/1997 | Van Oorschot et al. | 380/30 |
| 5,793,868 | 8/1998 | Micali | 380/28 |

OTHER PUBLICATIONS

Microsoft, "Microsoft Security Advisor Program: Microsoft Certificate Server", retrieved from Internet on Jan. 26, 1999.
American Bankers Association, American National Standard X9.30–199X, Public Key Cryptography using Irreversible Algorithms for the Financial Services Industry: Part 3: Certificate Management for DSA, Sep. 27, 1993.
Microsoft Corporation, "Microsoft Certificate Server", http://premium.microsoft.com/msdn/library/backgrnd/html/msdn_certserv.htm, pp. 1–10, Apr. 17, 1997.
Sun Microsystems, "Security—Sun Certificate Authorities", http://www.sun.com\/security/product/ca.html.
Microsoft Corporation, "Web Security", http://dostal.da.ru/ntserver/security/exec/feature/WebSecurity.asp, pp. 1–3.
Microsoft, Upgrading to Option Pack 4.0, www.microsoft.com, Mar. 1, 1999.
Microsoft, Windows NT Server 4.0 Features, www.microsoft.com, Dec. 31, 1998.

*Primary Examiner*—Tod R. Swann
*Assistant Examiner*—Paul E. Callahan
*Attorney, Agent, or Firm*—Markison & Reckamp, P.C.

[57] ABSTRACT

A computer network security system provides generation of a certificate revocation list (CRL) upon each revocation. The entire certificate revocation list may be published on demand, or only the portion that has changed. The computer network security system provides on-demand publishing of data identifying revoked certificates, such as revocation and expiration data, in response to receipt of revocation request data. The computer network security system stores the on-demand published data for analysis by one or more network nodes, such as a client, to determine whether a certificate is valid. The network nodes include certificate revocation list cache memory that may be selectively activated/deactivated, to effect storage/non-storage of the data identifying the revoked certificates.

27 Claims, 5 Drawing Sheets

1

COMPUTER SECURITY SYSTEM AND METHOD WITH ON DEMAND PUBLISHING OF CERTIFICATE REVOCATION LISTS

BACKGROUND OF THE INVENTION

The invention relates generally to computer security systems employing cryptographic techniques to secure information, and more particularly to computer network security systems using cryptographic techniques that employ public key certificate information.

In typical public-key cryptography systems, digital signature key pairs, such as a private key and public key, are used to authenticate a digital signature of a client to ensure that a message sent by a client actually came from the client sending the message. In addition to digital signature key pairs, encryption key pairs are also generally used to encrypt the data (which could include other cryptographic keys) being sent from one client to another client within the computer network. Certificates are generated by a manager or a trusted certification authority for the public keys of the private/public key pair to certify that the keys are authentic and are valid.

Each client, such as a network node computer stores a certification authority public key to verify that the certificate was made by the manager. A digital signature public key certificate typically includes a user public key, a user name and a signature of the certification authority. Each sender has a copy of its own certificate. To send an encrypted message, a sender accesses a directory, such as an onboard client cache memory or other certificate storage medium to get a copy of the encryption certificate for a specified receiver (other client). For a digitally signed message to be considered valid, the digital signature must be valid and the certificate containing the public key corresponding to the certificate must not have been revoked by the certification authority.

The public keys and certificates are used primarily for two main purposes: verifying digital signature and encrypting information. The receiver of a digitally signed E-mail or document for example, uses the public key in the senders certificate to verify the digital signature of the sender. A receiver validates the digital signature by looking at the received certificate. A public key certificate includes a public key which is bound to user name. The public key certificate also typically includes expiry data indicating the default expiration date or period for the public key certificate. Standard content of certificate revocation lists may be found for example in ISO standard X.509v3:1997. A certificate revocation list or revocation list distribution pointer may also be used which indicates a certificate revocation list in which the public key certificate would be referenced. The certificate revocation list memory may have a segmented certificate revocation list with associated distribution pointers as known in the art, to allow efficient distribution of revocation status information. A certificate revocation list is a list of uniquely-identifying serial numbers of revoked certificates, digitally signed by a trusted authority. For example, certificate revocation lists may be stored in a common repository for access by nodes (clients) in a networked computer system. A certificate revocation list may represent any suitable format. For example, the formats for noting revoked certificates may include: 1) a single revocation list; 2) a set of revocation lists (i.e., a segmentation of a set of revocation lists at various distribution points, the combination of which represents the entire set of revoked certificates; or 3) delta certificate revocation lists as described for example in standard X.509v3:1997 in combination with single revocation lists or segmented revocation lists.

A certificate may be revoked by a security officer through a security administration node or server if an employee is terminated or for other reasons, such as if a private key has been compromised. In addition, certificates can expire if an expiry period lapses. Also, certificate revocation lists have expiry dates. A client may know when to obtain a new certificate revocation list based on the expiry date. In some existing systems, clients store CRL's in cache memory and obtain a new CRL when the cached list expires or is no longer available to more efficiently process CRL's. Such systems may also issue a CRL earlier than originally scheduled. However, such cache memory cannot typically be disabled to facilitate immediate receipt or force acquisition of newly generated CRL's and therefore the client may not know that another unscheduled early CRL has been issued.

In conventional computer security systems, the security management server or certification authority typically collects revoked certificate data by queuing the data and publishes the revoked certificates with other currently revoked certificates on a periodic basis. However a problem arises with collecting and queuing revoked certificates since infrequent publishing can cause non-detection of revoked certificates thereby compromising the system.

Conversely, if certificate revocation lists are published too frequently, such as every ten minutes, a significant overhead burden is placed on the certification authority server (manager) which can significantly reduce the efficiency of the overall system particularly where a manager may serve hundreds of thousands of clients. Other systems are known which allow a client to cache certificate revocation lists for a period of time to reduce communication overhead with the manager. Some such known security systems for networked computers also segment certificate revocation list in repository memory to allow recordation of both revocation data and the expiry lapse data. However such systems again, typically only utilize certification authorities or managers that collect revoked certificates and queue them to publish them on a periodic basis with other existing revoked certificates.

Consequently, there exists a need for a cryptographic based computer network security system which provides a more efficient publication of the necessary certificate revocation information to clients in a system while maintaining proper security. Such a system should provide an improved solution for the problem of non-detection of revoked certificates.

DETAILED DESCRIPTION OF THE INVENTION

The disclosed computer network security system provides generation of a certificate revocation list (CRL) upon each revocation. The entire certificate revocation list may be published on demand or only the portion that has changed may be published. The computer network security system provides on-demand publishing of data identifying revoked certificates, such as revocation and expiration data, in response to receipt of revocation request data. The computer network security system stores the on-demand published data for analysis by one or more network nodes, such as a client, to determine whether a certificate is valid. The network nodes include certificate revocation list cache memory that may be selectively controlled, such as activated or deactivated, to facilitate evaluation of latest on demand published data identifying revoked certificates. The policy of disabling cache is under control of an organization or an end-user utilizing the network. The policy is enforced at the client node by client-end processes which utilize configuration files. For example, a data variable or setting in a configuration file can be used, where a "0" value indicates that caching is disabled and a non-zero value indicates that caching is enabled. Hence, the computer network security system provides on-demand publishing of certificate revocation list information on a per revocation request basis. Collecting or queuing of revocation list information may thereby be avoided.

Figure 1:
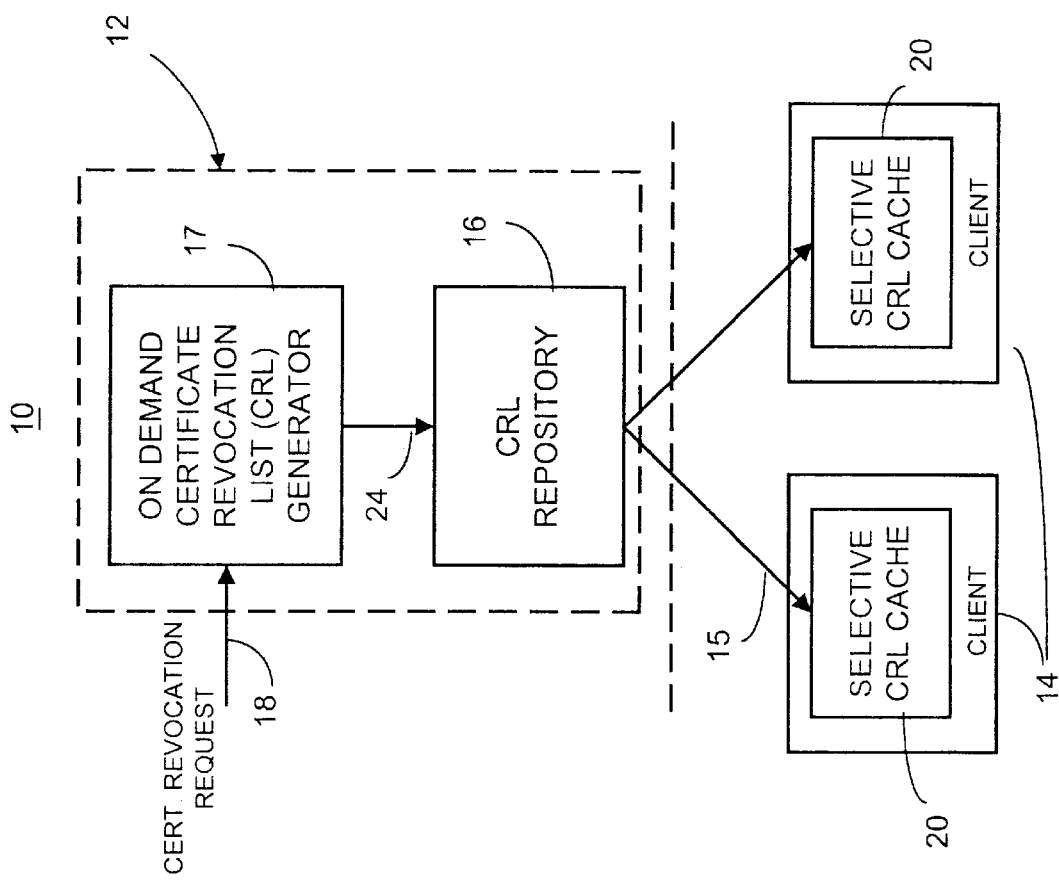
FIG. 1 is a block diagram generally illustrating a computer network security system having on-demand publishing of certificate revocation data in accordance with one embodiment of the invention.

FIG. 1 shows a computer network security system 10 having a certification authority 12, such as a suitably programmed network server or node, which is linked to a number of network nodes 14 through a communication link 15 such as modem link, wireless telecommunications link, local area network, the Internet, or any other suitable link. The network nodes 14 may be client computers communicating using public-key cryptographic techniques. The certification authority 12 includes a CRL repository 16 such as a database which is accessible by the network nodes 14. The CRL repository 16 includes segmented CRL's but may include whole lists or delta lists or any other suitable CRL configuration. The certification authority 12 also includes an on-demand certificate revocation list generator 17 for on-demand publishing of CRL's in the CRL repository 16. The term "certificate" as used herein includes any suitable data block containing data endorsed in some form by a digital signature of a recognized authority. A digital signature includes any direct or indirect manifestation of commitment or authentication on the part of an application or computer.

The on-demand certificate revocation list generator 17 is preferably a software program for providing on-demand publishing of data identifying revoked certificates in response to receipt of revocation request data 18. The program may be stored in any suitable storage medium including magnetic diskettes, PC Card ROM's, smart card memories, CD ROM's or other suitable memory device. Revocation request data 18 may be entered through a user interface and may be input by a security officer. The CRL repository 16 stores the on-demand published data for use by the network nodes 14 to determine whether a certificate is valid. Each network node 14 includes a software program that utilizes a caching flag for selectively controlling, such as activating and deactivating, certificate revocation list cache memory 20 to facilitate evaluation of the latest published CRL by effecting non storage of the certificate revocation list information stored in repository 16. The network node program may be stored in any suitable storage medium including magnetic diskettes, PC Card ROM's, smart card memories, CD ROM's, shared memory or other suitable memory device. The on-demand certificate revocation list generator 17 generates CRL update data 24 e.g., data identifying revoked certificates, for storage in the CRL repository 16. It will be understood by those of ordinary skill in the art, that the CRL repository 16 may be included as part of the certification authority 12 or may be a remote database or an offsite service providing CRL repository data. Similarly, the on-demand certificate revocation list generator 17 may be incorporated in the server 12 or may be in another computer and may send the revocation update data available to an on-line revocation status checking machine, which performs on-line CRL checking when queried by a network node 14 and is separate from the server or node that actually generates the CRL.

Figure 2:
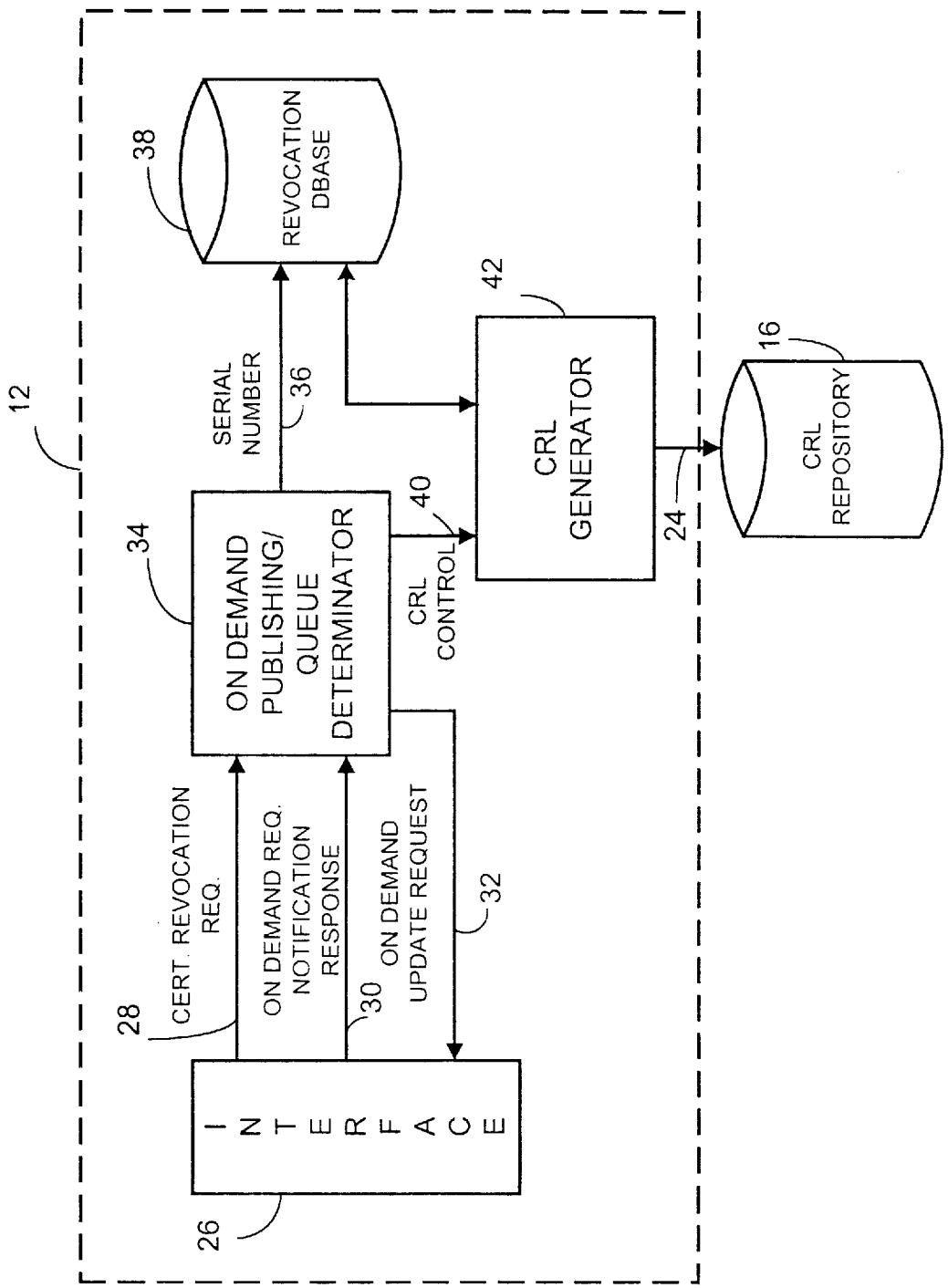
FIG. 2 is a block diagram illustrating in more detail the manager shown in FIG. 1.

FIG. 2 shows in more detail the certification authority 12 which includes an interface 26, such as a graphic user interface (GUI) or any other input mechanism (for example, input files), for allowing entry of input data which is used to generate certificate revocation request data 28, on-demand request notification response data 30 and for outputting on-demand update request data 32. The on-demand certificate revocation list generator 17 includes an on-demand publishing/queue determinator 34 which is responsive to the revocation request data 28 for determining whether to publish the data identifying revoked certificates on demand and for generating an updated certificate revocation list for on-demand publishing to network nodes 14 if on-demand publishing is specified. The revocation request data may include data representing a reason for the revocation such as data representing whether an employee associated with the certificate has been discontinued in a particular job function or role or data representing that revocation is needed due to a compromised private key. In this way, the server, under software control determines whether to publish on demand in response to data representing a reason for certificate revocation. It may be advantageous to always publish on demand if the reason for revocation is due to private key security compromise since all members should be aware immediately not to accept messages from a user of a compromised key to avoid theft or further security breaches.

Each certificate includes unique data identifying attributes about a network node, such as conventional certificate data. Whether on-demand publishing is specified is determined based on the on-demand request notification response data 30 as further described below. The on-demand publishing/queue determinator 34 generates the on-demand update request data 32 and receives the on-demand request notification response data 30. If an on-demand publishing request is not made, the on-demand publishing/queue determinator 34 queues the revoked certificate data as in conventional security systems and stores serial number data 36 in a revocation database 38. If a security officer requests on-demand publication through interface 26 (which could be an interface configured to automatically request on-demand publication; for example, through a setting or "flag") by responding to an on-demand update request data 32, the on-demand publishing/queue determinator 34 generates a certificate revocation list control signal 40 to control CRL generator 42 to output a certificate revocation list on a per revocation request basis. The revocation request may also be a batch revocation request where a bulk list of revocations is read from a file. The CRL generator 42 outputs the data identifying revoked certificates to the segmented CRL repository 16 for retrieval by the network nodes 14. Even if a security officer requests on-demand publication through interface 26, the publishing/queue determinator 34 queues the revoked certificate data as in conventional security systems and stores serial number data 36 in a revocation database 38.

The CRL repository 16 has certificate revocation list memory having memory segments for one or more groups of certificates wherein each segment facilitates storage of data representing whether a certificate has been revoked and/or whether it has expired. Such segmented CRL's are further described for example in U.S. patent application No. 08/556,360 entitled "Method for Efficient Management of Certificate Revocation Lists and Update Information" which issued as U.S. Pat. No. 5,699,431. The CRL generator 42 causes the CRL repository 16 to selectively store data in a corresponding segment of memory. When the certificate revocation list information is to be queued as in a conventional system, the CRL generator 42 obtains the queued information from the revocation database 38 and outputs the certificate revocation list information to the CRL repository 16 on a periodic basis.

Figure 3:
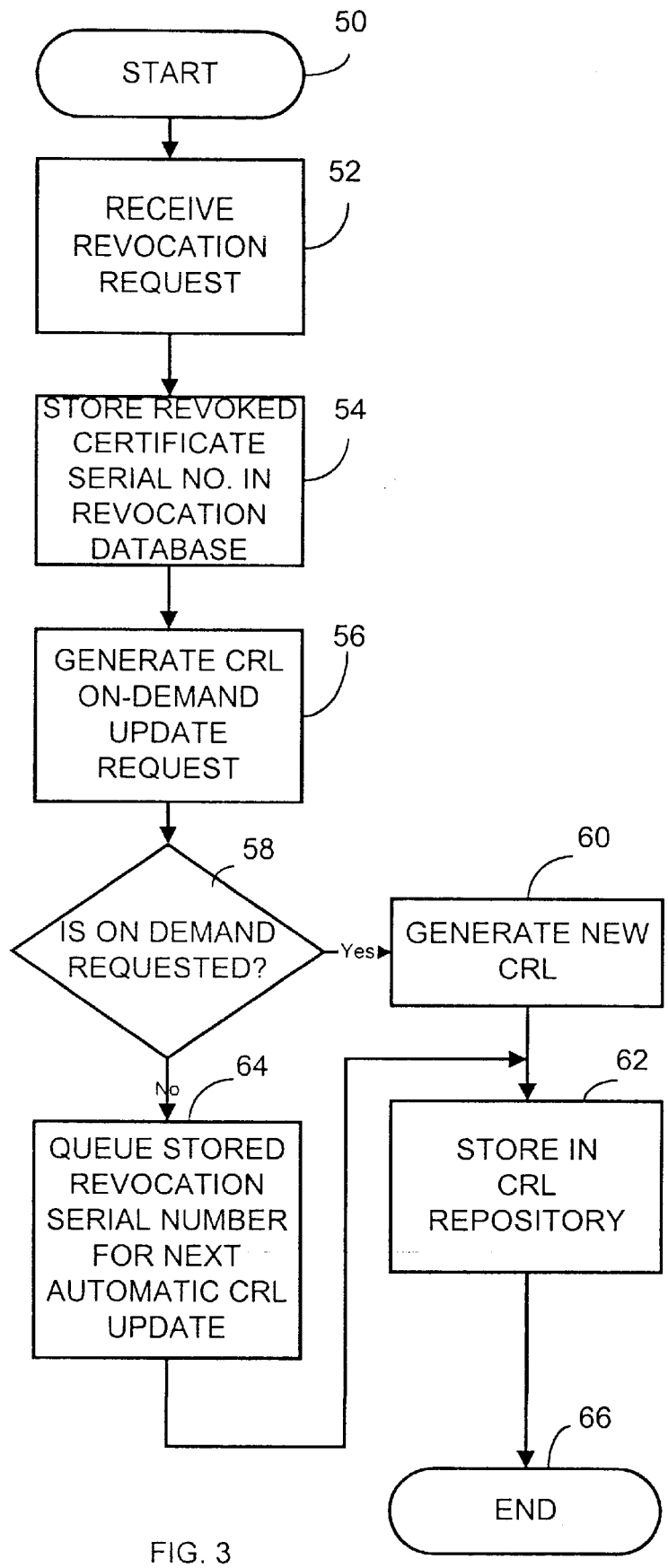
FIG. 3 is a flowchart generally illustrating the operation of the manager shown in FIG. 2.

FIG. 3 shows one example of the operation of the on-demand certificate revocation list generator 17 which begins by initializing the system to receive information through interface 26, as shown in block 50. The on-demand publishing/queue determinator 34 receives revocation request data 28 through interface 26 as indicated in block 52 from another software application or a security officer. For example, if a security officer must revoke a certificate because a user of the client has left the company or if a private key has been compromised, the security officer may activate a GUI interface button indicating that a certificate revocation request has been activated. The certificate revocation request data 28 includes identification data for the certificate to be revoked, such as serial number data. The on-demand publishing/queue determinator 34 stores the revoked certificate serial number 36 in the revocation database 38 as indicated in block 54. The on-demand publishing/queue determinator 34 then generates an on-demand CRL update request 32, as shown in block 56. The interface 26 receives the on-demand update request data 32 and prompts the security officer to indicate whether this certificate revocation should be published on-demand or whether the certificate revocation information should be queued. The security officer or software application may activate a GUI interface button indicating that on-demand publication is requested. The on-demand publishing/queue determinator 34 generates the on-demand request notification response data 30. Alternatively, on-demand publishing may be preconfigured as a default setting or "flag" so that it occurs automatically without items 32 and 30 being necessary.

The on-demand publishing/queue determinator 34 determines whether on-demand publication has been requested as shown in block 58 by evaluating whether or not the on-demand request notification response has been received. If the on-demand request notification response data 30 indicates that on-demand publishing is requested, the on-demand publishing/queue determinator 34 generates a new certificate revocation list as shown in block 60. The on-demand publishing/queue determinator 34 then generates the CRL control signal 40 to control the CRL generator 42 to store the newly generated CRL in repository 16 as shown in block 62.

If on-demand publishing is not requested, the on-demand publishing/queue determinator 34 queues the stored revocation serial number 36 in revocation database 38 for the next preset automatic CRL update as shown in block 64. The on-demand publishing queue determinator 34 then waits for another certificate revocation request data 28 as shown in block 66.

Figure 4A:
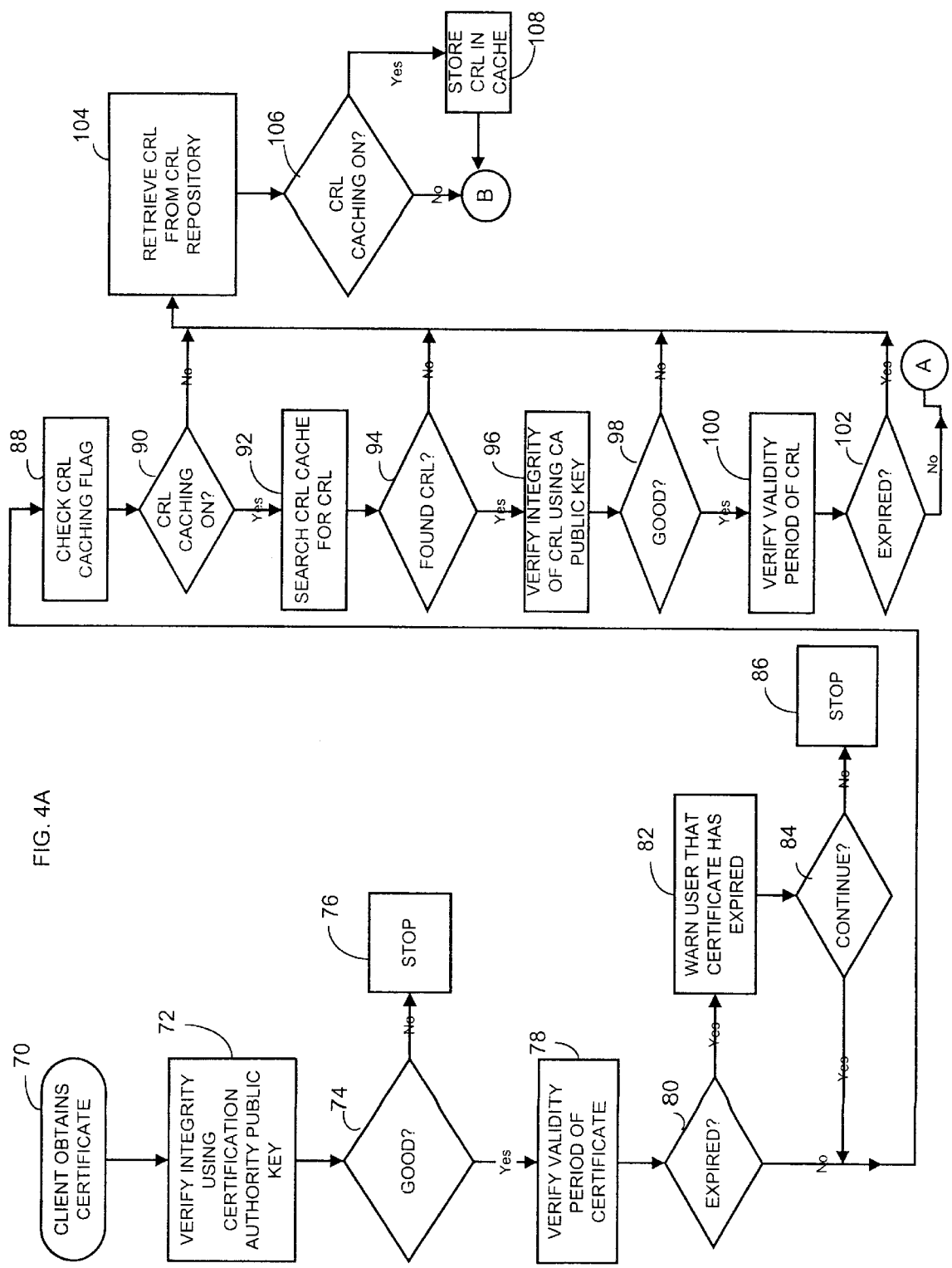
FIGS. 4a and 4b depict a flowchart generally illustrating the operation of a client with selective certificate revocation list cache memory in accordance with one embodiment of the invention.
Figure 4B:
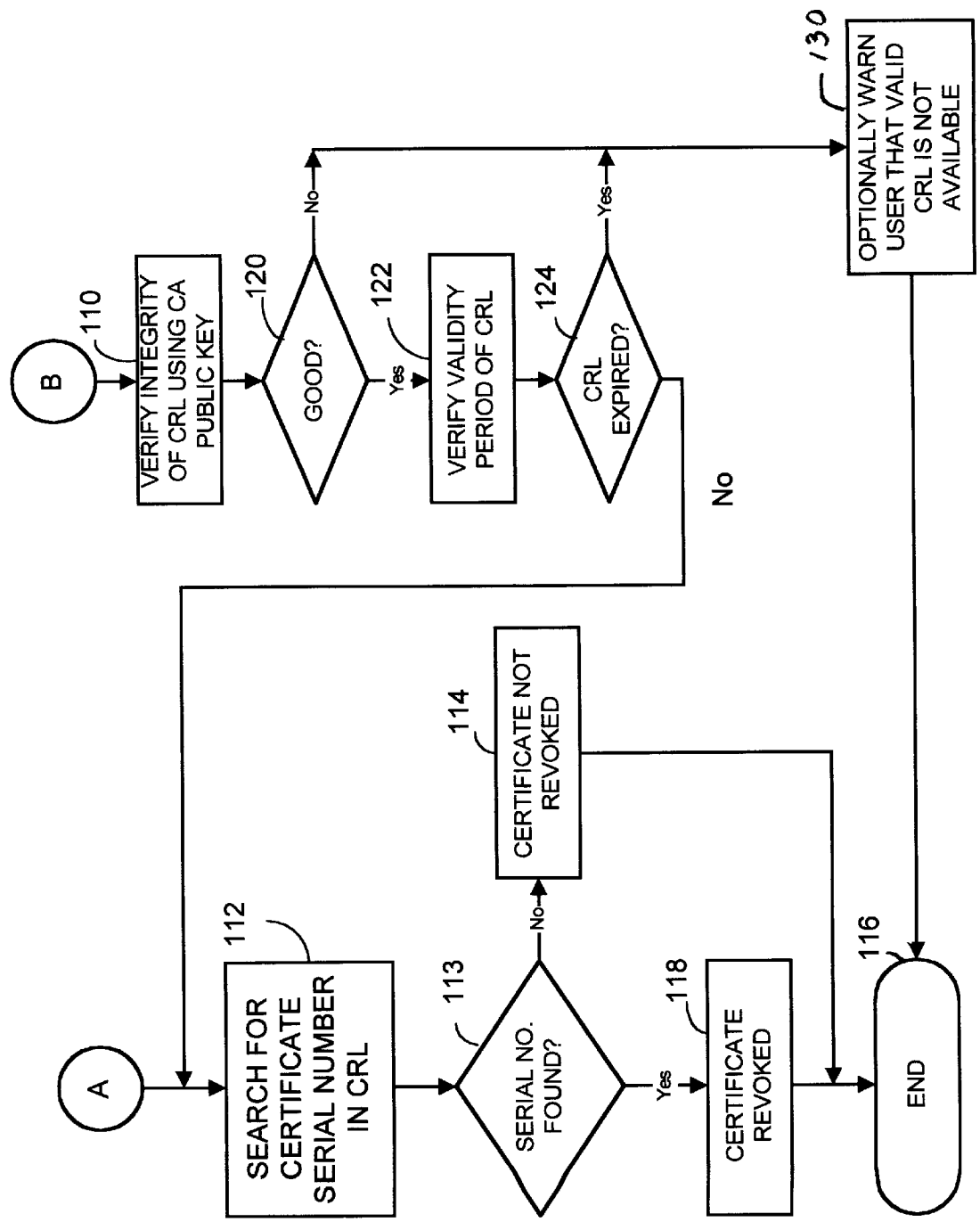

Referring to FIGS. 4a and 4b, a client or network node 14 operating in the computer network security system 10, during normal operation, obtains a public key certificate, for example, to authenticate a received message or to encrypt information for an intended recipient, as shown in block 70. The network node 14 verifies the integrity of the certificate signature using the trusted certification authority public key as known in the art, as shown in block 72. If the certificate signature is not acceptable, the network node does not process the received secure transmission as shown in blocks 74 and 76. If however, the certificate signature is acceptable, the network node 14 verifies the validity period of the certificate as known in the art and shown in block 78. It will be recognized that validity may be based on any suitable criteria. For example, validity need not be based on a time period, but may be based on other criteria. The client or network node 14 determines whether the expiry period has lapsed as shown in block 80. If the expiry period of the certificate is lapsed, the network node 14 warns the user that the certificate has expired as shown in block 82 and prompts the user to indicate whether the user wishes to continue as shown in block 84. If the user does not wish to continue, the network node then stops processing secured transmission as shown in block 86. Alternatively, if the certificate has expired (at block 80) the system may stop at block 86 directly without user choice.

Referring back to block 80, if the certificate expiry period has not lapsed, the network node 14 checks a certificate revocation list caching flag as shown in block 88. Based on the caching flag, the network node 14 determines whether the CRL certificate revocation list cache memory is activated as shown in block 90. Activation of the caching flag may be done by a centralized mechanism such as a control signal received a priori from a manager or server node, through a certificate setting (for example, attribute certificate or policy certificate) or locally on each node through a variable or setting. If the CRL caching has been activated, meaning that the client or network node periodically accesses the CRL repository 16 to get a current certificate revocation list (or portion) and then stores the data locally, the network node 14 searches the CRL cache for the certificate revocation list as shown in block 92. The network node 14 determines whether the certificate revocation list was found as shown in block 94. If the CRL has been found, the network node 14 verifies the integrity of the CRL using the certification authority public key as known in the art, as shown in block 96.

If the certification authority signature on the CRL is acceptable, the network node verifies the validity period of the certificate revocation list as shown in block 98 and 100. The network node then determines whether the expiry period of the CRL has lapsed as shown in block 102. The node evaluates whether a certificate key has been revoked based on status and/or content of the certificate revocation list memory. For example, if one of the following conditions is met, the network node retrieves the certificate revocation list from the CRL repository 16 as shown in block 104: if the CRL caching flag is off, if no certification certificate revocation list is found locally, if the integrity of the certification authority signature on the CRL is not acceptable and if the expiry period of the CRL has expired. If the network node retrieves the certification revocation list from the repository as shown in block 104, the network node 14 determines again whether the CRL caching is on as shown in block 106. If the CRL caching is on, the cache is updated by storing the CRL in cache memory as shown in block 108. In either case, the system verifies the validity of the CRL using the certification authority public key as shown in block 110 (FIG. 4b).

Referring back to block 102, if the CRL is valid, the network node 14 searches the CRL for the certificate serial number as shown in block 112. The client or network node evaluates whether the serial number was found as shown in block 113 wherein if no serial number was found, the certificate is determined to be not revoked as shown in block 114 and the received message can then be processed as shown in block 116. If however, the serial number is found on the CRL, the network node 14 determines that the certificate has been revoked as shown in block 118 based on the certificate revocation information in the certificate revocation list cache memory.

Referring back to block 110 after having retrieved the CRL from the CRL repository, the network node 14 determines whether the CRL is acceptable as shown in block 120. If the CRL signature integrity is acceptable, the network node 14 verifies the validity period of the CRL as shown in block 122. If the validity period has expired as shown in block 124, the network node 14 then optionally warns the user that a valid CRL is not available and therefore its revocation state is not known. If desired, the received message is left unprocessed. Alternatively, the received message is processed after the user warning and subsequently recorded in a log file as shown in block 130. If however the CRL has not expired, the network node then searches for the certificate serial number in the CRL as shown in block 112.

Based on the foregoing, the disclosed security system and method publishes a CRL, on demand, when a new certificate is revoked. This affords a reduction in manager overhead since publication is only performed when a revocation occurs and all the clients will have updated information since this information is effectively available to the client as soon as a new revocation occurs. The certification authority publishes the entire CRL or alternatively publishes only a delta-CRL or segments which have been updated since the last on-demand or regular publication request. The selective disabling of the cache memory in the network node can be under policy control of a central server or configurable by an end user. In any case, enforcement of any policy regarding the enabling or disabling of CRL caching is preferably performed at the client end. With caching selectively disabled, the system effectively provides immediate revocation notification through on-demand publishing of revocation information, or can be used to provide notification within an acceptably small window of time depending upon the application in use.

In an alternative embodiment, the queue determinator 34 could subsequently be triggered to initiate a CRL publication by an independent control message such as notification response data 30, but which need not be preceded by certificate revocation request data 28 or an on-demand update request 32. Also, where the network nodes 14 do not have CRL caching capability, the server 12 may prompt a security officer through interface 26 at the time of revocation entry, as to whether the certificate revocation update should be propagated. In addition, on demand publishing can include immediate publishing in response to receiving certificate revocation request data 28 without requiring generation of the on demand update request data 32 (and corresponding answer 30).

It should be understood that the implementation of other variations and modifications of the invention in its various aspects will be apparent to those of ordinary skill in the art, and that the invention is not limited by the specific embodiments described. For example, the system described herein can be used for certificates containing data items other than public keys or any other suitable certificates such as attribute certificates or certificates containing any suitable data. Also, the system and method, while described with reference to communicating status regarding the revocation of a certificate, is also understood to apply broadly to data representing termination, invalidation or a withdraw of prior grant of authority, privilege or commitment. It is therefore contemplated to cover by the present invention, any and all modifications, variations, or equivalents that fall within the spirit and scope of the basic underlying principles disclosed and claimed herein.

What is claimed is:

1. A computer network security system comprising:
   means for on demand publishing of data identifying revoked certificates in response to receipt of revocation request data including means, responsive to the revocation request data, for determining whether to publish the data identifying revoked certificates on demand and for generating an updated certificate revocation list for on demand publishing to at least one network node if on demand publishing is specified wherein the means for determining whether to publish the data generates on demand update request data and receives response data representing whether on demand publishing of the data is specified and wherein the means for on demand publishing determines whether to publish on demand in response to data representing a reason for certificate revocation; and
   means for storing the on demand published data for use to determine whether a certificate is valid including certificate revocation list memory having a segmented certificate revocation list with associated distribution pointers.

2. The system of claim 1 including a network node that determines whether the certificate is valid and including means for selectively controlling certificate revocation list cache memory to facilitate evaluation of latest on demand published data identifying revoked certificates.

3. The system of claim 1 wherein the means for on demand publishing of the data identifying revoked certificates outputs a certificate revocation list on a per revocation request basis.

4. The system of claim 1 wherein the means for on demand publishing of the data identifying revoked certificates specifies the data that has changed from a previous publication.

5. The system of claim 2 wherein the means for selectively controlling certificate revocation list cache memory includes means for determining whether the certificate revocation list cache memory is activated.

6. A computer network security system comprising:
   means for on demand publishing of data identifying revoked certificates in response to receipt of revocation request data on a per revocation request basis including means, responsive to the revocation request data, for determining whether to publish the data identifying revoked certificates on demand and for generating an updated certificate revocation list for on demand publishing to a network node if on demand publishing is specified;
   means for storing the on demand published data for use by the network node to determine whether a certificate is valid including certificate revocation list memory having a segmented certificate revocation list with associated distribution pointers; and
   wherein the network node includes means for selectively controlling certificate revocation list cache memory to facilitate evaluation of latest on demand published data identifying revoked certificates.

7. The system of claim 6 wherein the means for determining whether to publish the data generates on demand update request data and receives response data representing whether on demand publishing of the data is specified.

8. The system of claim 6 wherein the means for on demand publishing determines whether to publish on demand in response to data representing a reason for certificate revocation.

9. The system of claim 6 wherein the means for on demand publishing of the data identifying revoked certificates specifies the data that has changed from a previous publication.

10. The system of claim 7 wherein the means for selectively controlling certificate revocation list cache memory includes means for determining whether the certificate revocation list cache memory is activated.

11. A computer network security method comprising the steps of:

providing on demand publishing of data identifying revoked certificates in response to receipt of revocation request data;

enabling a network node to selectively control certificate revocation list cache memory to effect non-storage of the data identifying revoked certificates; and storing the on demand published data for use in determining whether a certificate is valid, using certificate revocation list memory having a segmented certificate revocation list with associated distribution pointers.

12. The method of claim 11 wherein the step of providing on demand publishing of the data identifying revoked certificates includes outputting a certificate revocation list on a per revocation request basis.

13. The method of claim 11 wherein providing on demand publishing of the data identifying revoked certificates includes determining whether to publish the data identifying revoked certificates on demand and for generating an updated certificate revocation list for on demand publishing to network nodes if on demand publishing is specified.

14. The method of claim 13 wherein determining whether to publish the data includes generating on demand update request data and receiving response data representing whether on demand publishing of the data is specified.

15. The method of claim 11 wherein providing on demand publishing includes determining whether to publish on demand in response to data representing a reason for certificate revocation.

16. The method of claim 11 wherein providing on demand publishing of the data identifying revoked certificates includes publishing the data that has changed from a previous publication.

17. The method of claim 11 wherein selectively controlling certificate revocation list cache memory includes determining whether the certificate revocation list cache memory is activated.

18. A storage medium for storing programming instructions that, when read by a processing unit, causes the processing unit to provide on demand publishing of data representing revoked certificates, the storage medium comprising:

means for storing programming instructions that provide on demand publishing of data identifying revoked certificates in response to receipt of revocation request data and enabling a network node to selectively control certificate revocation list cache memory to effect non-storage of the data identifying revoked certificates; and means for storing programming instructions that facilitate storage of the on demand published data for use to determine whether a certificate is valid, using certificate revocation list memory having a segmented certificate revocation list with associated distribution pointers.

19. The storage medium of claim 18 wherein the means for storing programming instructions that, when read by a processing unit, causes the processing unit to provide on demand publishing includes programming instructions that facilitate determining whether to publish the data identifying revoked certificates on demand and for generating an updated certificate revocation list for on demand publishing to network nodes if on demand publishing is specified.

20. A computer network security method comprising the steps of:

selectively controlling certificate revocation list cache memory to facilitate evaluation of latest on demand published data identifying revoked certificates; and evaluating whether a certificate is revoked based on at least one of a status and content of the certificate revocation list cache memory.

21. A computer network security system comprising:

means for on demand publishing of data identifying revoked certificates in response to receipt of revocation request data and in response to on demand update request data;

means for storing the on demand published data for use to determine whether a certificate is valid; and means for selectively controlling certificate revocation list cache memory to facilitate evaluation of latest on demand published data identifying revoked certificates and includes means for determining whether the certificate revocation list cache memory is activated.

22. The system of claim 21 wherein the means for on demand publishing of the data identifying revoked certificates outputs a certificate revocation list on a per revocation request basis.

23. The system of claim 21 wherein the means for on demand publishing of the data identifying revoked certificates includes means, responsive to the revocation request data, for determining whether to publish the data identifying revoked certificates on demand and for generating an updated certificate revocation list for on demand publishing for at least one network node if on demand publishing is specified.

24. The system of claim 23 wherein the means for determining whether to publish the data generates on demand update request data and receives response data representing whether on demand publishing of the data is specified.

25. The system of claim 21 wherein the means for storing on demand published certificate revocation data includes certificate revocation list memory having a segmented certificate revocation list with associated distribution pointers.

26. The system of claim 21 wherein the means for on demand publishing determines whether to publish on demand in response to data representing a reason for certificate revocation.

27. The system of claim 21 wherein the means for on demand publishing of the data identifying revoked certificates specifies the data that has changed from a previous publication.

* * * * *